United States Patent [19]

Hanna et al.

[11] 4,449,119
[45] May 15, 1984

[54] SELF-CLOCKING SERIAL DECODER

[75] Inventors: Craig A. Hanna, Vestal; Edmund Lancki, Newark Valley, both of N.Y.

[73] Assignee: International Business Machines Corporation, Armonk, N.Y.

[21] Appl. No.: 330,621

[22] Filed: Dec. 14, 1981

[51] Int. Cl.³ ............................................... G06F 3/00
[52] U.S. Cl. .............................. 340/347 DD; 375/87
[58] Field of Search ................. 340/347 DD; 360/44; 375/87, 110, 55

[56] References Cited

U.S. PATENT DOCUMENTS

| | | | |
|---|---|---|---|
| 4,185,273 | 1/1980 | Gowan | 340/347 DD |
| 4,218,770 | 8/1980 | Weller | 375/110 |
| 4,242,755 | 12/1980 | Gauzan | 375/87 X |
| 4,276,656 | 6/1981 | Petryk | 375/55 |
| 4,317,111 | 2/1982 | Masoero | 340/347 DD |
| 4,320,525 | 3/1982 | Woodward | 360/44 |

*Primary Examiner*—C. D. Miller
*Attorney, Agent, or Firm*—Kenneth P. Johnson

[57] ABSTRACT

Apparatus for generating clocking pulses from serially transmitted data in which a level shift recurs with each bit. The circuit uses a coincidence of data word recognition and initial level shift to generate an initial clock pulse and thereafter uses the delayed clock pulses and level shift to produce subsequent clock pulses. A data word recognition circuit is also disclosed that employs a delay line for examining the profile of a synchronizing wave form.

18 Claims, 4 Drawing Figures

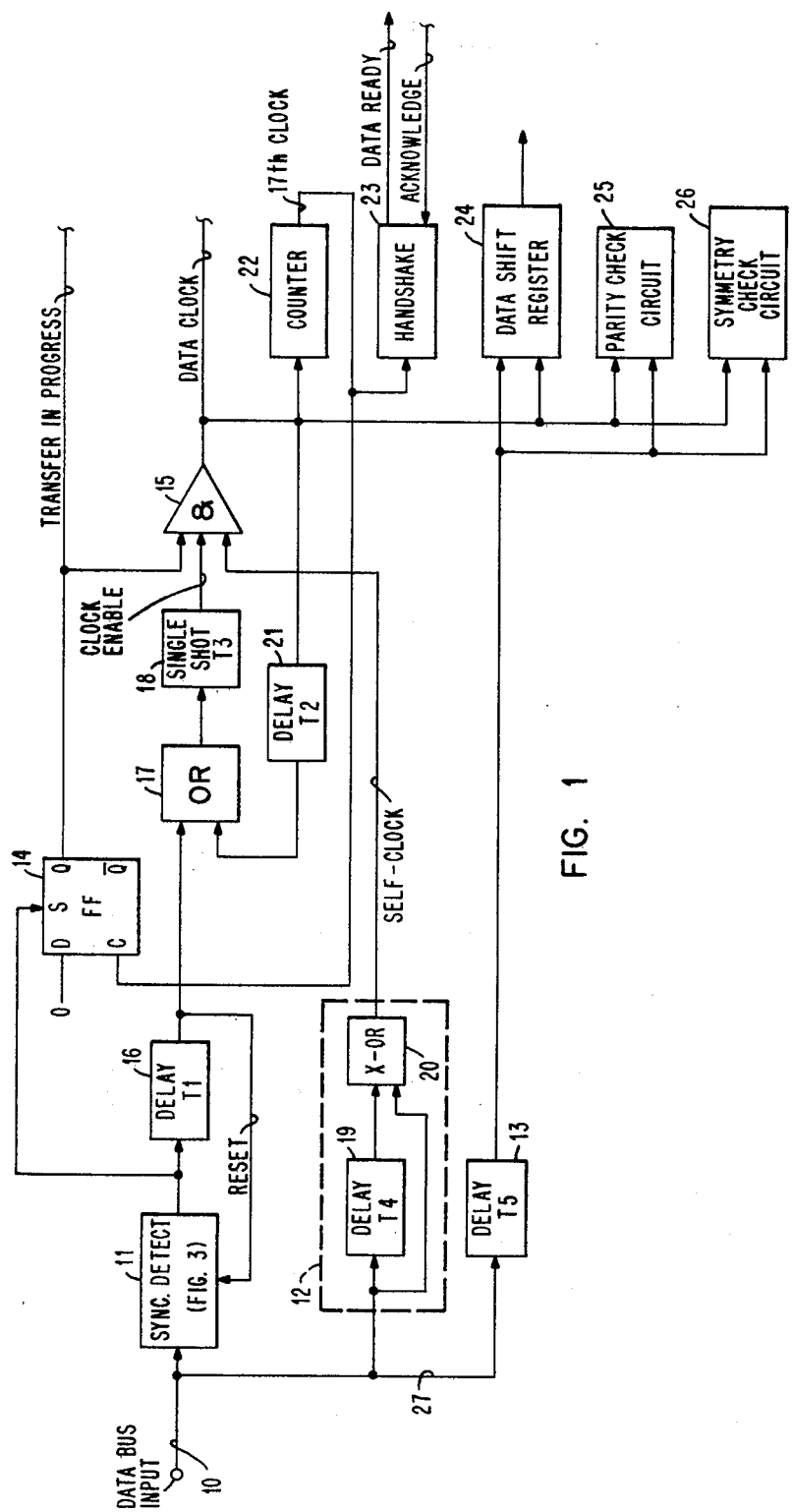
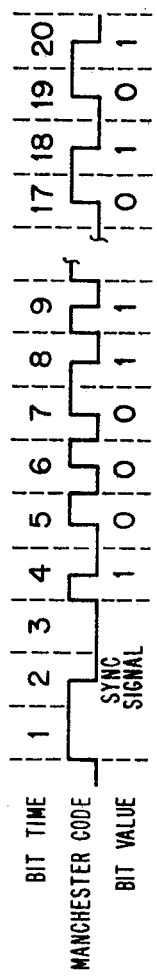
FIG. 1
FIG. 2

SELF-CLOCKING SERIAL DECODER

This invention relates generally to serial data transmission and more particularly to decoding circuits for the data receivers.

BACKGROUND OF THE INVENTION

As the transmission rates of serial digital data steadily increase, the synchronization between the transmitter and remote receivers becomes more complex, expensive and error prone. High bit rates of 50 megabits and greater require sophisticated circuits with components of precise values and redundant checking techniques. As the bit rates approach the switching limits of the decoder, the internal noise of the decoder becomes proportionately higher. Heretofore, at the lower bit rates there was an opportunity to sample the transmitted data frequently each bit time but the current rates preclude that technique. Therefore, the noise encountered during both transmission and decoding is a more significant factor and necessitates extensive countermeasures.

In the transmission of signals such as the Manchester code, the typical receiver uses fixed frequency oscillators to sample the input wave form. Most of these are difficult to operate, and they generate an excessive number of errors. The use of phase-locked loops is a related technique of demodulation but this is unsuitable for data bus operation which requires multiplexing since multiple receivers and transmitters are attached to the data bus.

OBJECTS AND SUMMARY OF THE INVENTION

It is accordingly a primary object of this invention to provide simplified serial digital data decoding apparatus that derives its necessary timing from the input data signal thus permitting greater timing latitude between the transmitting and receiving devices.

A further object of this invention is to provide serial digital data decoding apparatus that can be readily attached to either optical or electrical data transmission buses and to buses having multiple transmitters and receivers.

Still another object of this invention is to provide serial digital data decoding apparatus that is adaptable to multiplexing operation.

Yet another object of this invention is to provide serial digital data decoding apparatus for bi-phase codes that derives necessary timing from the input data signal and is simpler in construction, less expensive and less error prone.

The foregoing objects are attained in accordance with the invention by providing means for detecting the leading synchronizing wave form of the transmitted bi-phase data word signals by recognizing the profile of the extended wave form with a multitap delay line and switch means, then using the delayed output thereof in conjunction with the fact of word recognition and a following wave form transition in a coincidence means to produce the first clocking signal. This clocking signal is used to initiate through other appropriate fixed delay means subsequent clock signal cycles which repeat until terminated by counter means indicating the end of the data word transmission. These clock signals are used to gate corresponding delayed data signals into data register means. The series of clock pulses can also be used to control additional functions such as parity and symmetry checking.

The invention is particularly adapted to high speed Manchester code data buses because of its asynchronous operation. All timing signals are derived from the transmitted wave form of each data, status or command word; no oscillator is required so that there are no race conditions. Further, the tolerance of the delay elements need not be close and the delays can easily vary 10 percent from the nominal while maintaining acceptable performance. The disclosed decoder makes optimum use of the logic band width and operates close to the maximum toggle frequency of the logic family used.

The above and other objects, features and advantages of the invention will be apparent from the following more detailed description of the preferred embodiments thereof as illustrated in the accompanying drawings.

BRIEF DESCRIPTION OF THE DRAWINGS

FIG. 1 is a block diagram showing the main elements of decoding apparatus emboding the principles of this invention;

FIG. 2 is a diagram of a bi-phase data encoding technique for which the invention is adapted as a decoder;

DESCRIPTION OF THE PREFERRED EMBODIMENT

Figure 3:
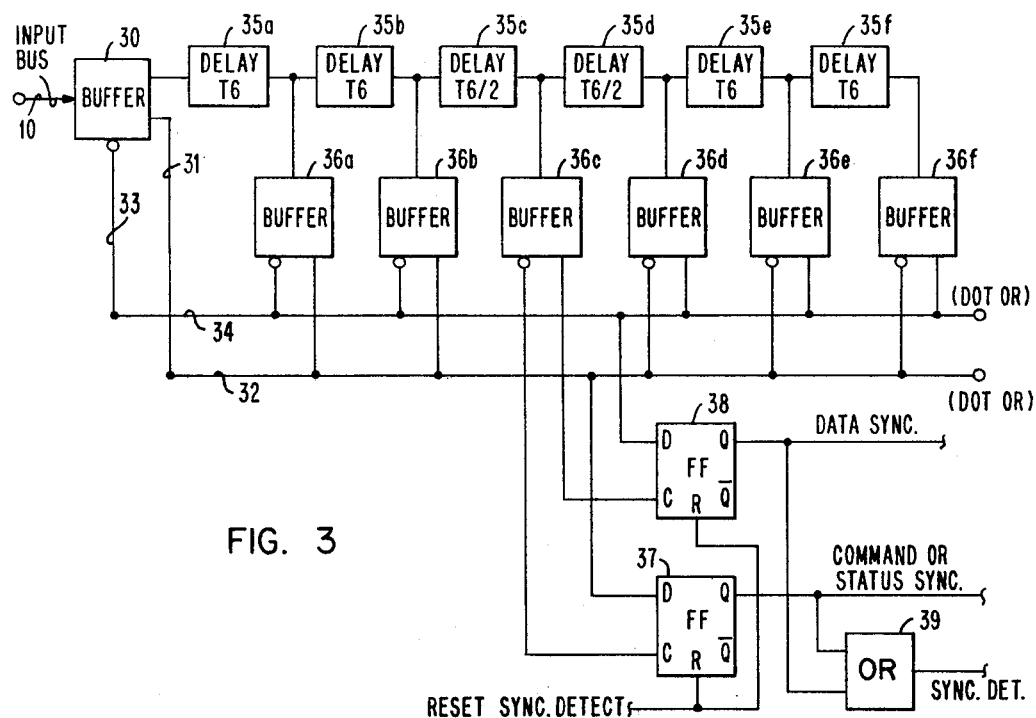
FIG. 3 is a schematic diagram of a circuit for detecting the synchronizing wave form portion of a transmitted data word shown in the code of FIG. 2.

Referring to FIGS. 1 and 2, there is shown a circuit for generating timing or clocking signals directly from the serial data stream of a redundant type of code such as the Manchester code. An example of this code is shown in FIG. 2 and has the characteristic that each data bit must have either a negative or positive-going shift in the signal level at the mid-point of each bit time. A negative-going shift represents a binary "1" while a positive-going shift represents a binary "0;" the illustrated wave form produces the bit values shown.

Each data word comprises 20 bit times of which the first three are used as a synchronization or "SYNC" signal. The SYNC signal is comprised of a positive or high level of 1.5 bit times and a negative or low level of 1.5 bit times so that the entire SYNC signal is 3 bit times in duration. Either level may occur first followed by the other; if the high level is first, it indicates that the following 17 bits represent either a "command" or "status" word and the opposite arrangement of levels indicates a "data" word. The use of "data word" herein is intended generically to indicate a code word of SYNC signal and data bit signals.

The signals are usually transmitted via a data bus that may be either electrical conductors or optical fibers. When an optical bus is used, suitable transducers are required, of course, to convert the signals to electrical signals detectable by the receiving decoder. Referring to FIG. 1, the decoding circuit is connected to bus 10 through its SYNC signal detection circuit 11, self-clock detector circuit 12 and data signal delay 13. A suitable SYNC detector circuit is shown in greater detail in FIG. 3 and will be described hereinafter. It may be assumed at this time that the detector circuit will provide an output signal upon recognition of the synchronizing portion of the transmitted word. The SYNC detector output is operable to set flip-flop 14 to the on state when a synchronizing signal is recognized and thereby indicate that a data transfer is in progress. This latter signal is supplied as a conditioning input to AND gate 15. The output from SYNC detector circuit 11 is also supplied to delay circuit 16 whose output is used both as a reset for the SYNC detector circuit and as an input to OR gate 17. The output from OR 17 turns single shot 18 on for a predetermined time. The output thereof also serves as a conditioning signal for AND gate 15.

Self-clock detector circuit 12 is comprised of delay element 19 and an exclusive OR circuit 20, and is operable to provide an output pulse in response to each signal level transition sensed on the data bus whether or not it is a data bit. This is accomplished by the technique of passing the bus signal directly to one input of exclusive OR 20 and the other through delay circuit 19. The output of the exclusive OR will be present only during the interval that its two inputs are different. This output is supplied to AND gate 15 and serves to produce data clock pulses therefrom as long as the gate is conditioned by the remaining two inputs. Each data clock pulse is applied to another delay circuit 21 whose output is also supplied as input to OR 17. This arrangement enables the data clock signals from gate 15 to in effect self-condition the gate since only a single SYNC detect circuit output pulse will be present for each word.

The data clock signals are also applied to a counter circuit 22 which is operable to provide a termination signal at the seventeenth clock pulse for each transmitted word by resetting flip-flop 14 and blocking gate 15 from producing further data clock pulses. The counter output is also effective to enable a "handshake" circuit resulting in the transmission of a "data ready" signal. The data clock pulses are used to further condition data shift register 24 for the receipt and temporary serial storage of data pulses from the output of delay circuit 13 which is connected directly to the data bus. Both the data pulses and data clock pulses can be applied to a parity check circuit 25 and symmetry check circuit 26 if desired.

Figure 4:
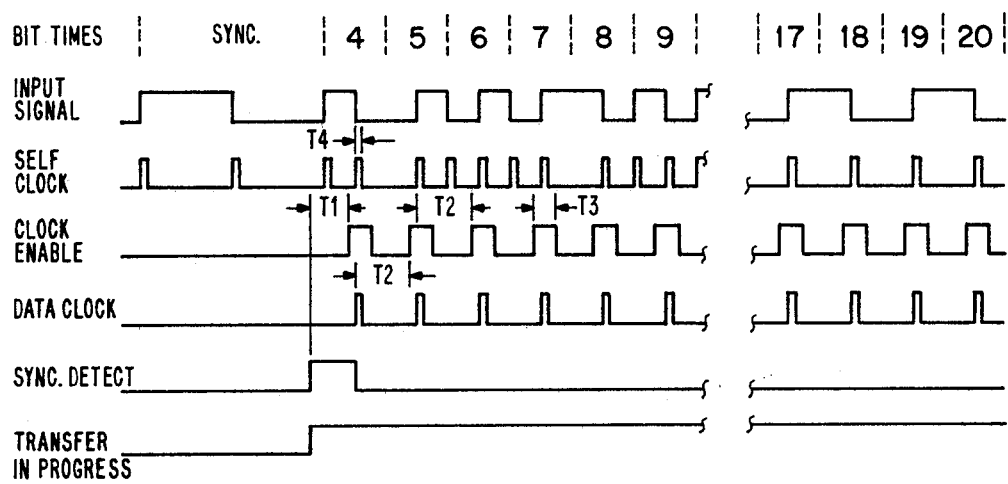
FIG. 4 is a timing diagram of the signal wave forms encountered at selected points of the diagram in FIG. 1.

The operation of the circuit in FIG. 1 will be described in conjunction with the timing diagrams of FIG. 4. It will be assumed that the transmission rate in the following example is 50 megabits so that each bit time equals 20 nanoseconds. The delay times of elements 16, 21, 18 and 19 are respectively as follows: $T1 = 15 - (T3 - T4)/2 = 11$ ns.; $T2 = 20$ ns. $- (T3 - T4)/2 = 16$ ns.; $T3 = 10$ ns. and $T4 = 2$ ns. A further assumption will be that the SYNC signal has been recognized by detector circuit 11. This signal usually occurs 4 ns. to 5 ns. prior to the first level transition at the end of the synchronizing signal or the beginning of bit time 4. Flip-flop 14, which indicates a data transfer is in progress, is turned on to partially condition AND 15. The SYNC signal is delayed 11 ns. at delay 16 or for approximately one half bit time. The delayed SYNC signal resets SYNC detector 11 and enables single shot 18 for 10 ns. as a clock enable signal through OR 17 which fully conditions gate 15. Thereafter, any level shift on data bus 10 will accurately generate a pulse of about 2 ns. duration from self-clock 12 and gate 15 will provide an output data clock signal. This signal is effective to increment counter 22 as the first of seventeen clock pulses and to gate data shift register 24 for accepting the data shift signal that appeared on line 27 from bus 10. The signal on line 27 which appears at delay 13 is delayed only sufficiently to center the pulse with respect to the data clock signal at those circuits where it is used in conjunction with the data clock. The delay is typically 2 or 3 ns.

Since there will be no further SYNC pulses generated for the duration of the remaining 16 bit times in the data word, the gating of AND 15 is done by feeding back data clock signals through delay 21 to OR 17. The data clock signal is delayed for 16 ns. before turning on single shot 18 through OR 17. It will be noted that a self-clock pulse occurs during each level shift but that only those occurring at the midpoint of each bit time are effective to generate a data clock signal. The data clock signals rely on the accuracy of the requirement that the data shift signals occur at the middle of the bit times.

Since a data clock signal is generated at the midpoint of each bit time, each clock signal indicates the occurrence of a bit time and is therefore counted in counter 22. When the seventeenth and last bit time of a data word has been indicated in the counter, its output is operable to reset flip-flop 14 terminating the signal that a transfer is in progress. The counter output can also be used to initiate the "handshake" operation indicating that data can be transferred from shift register 24 or indicating to the receiving unit that the data are ready.

A SYNC detection circuit suitable for use with the decoder circuit is shown in FIG. 3. Data input bus 10 is connected to buffer 30 which provides concurrently a true output of the bus signal level on lines 31 and 32 and a complement of the output level on lines 33 and 34. A true output is also applied to a delay line comprised of a series of six delay units 35a–35f. The delay lines can be merely segments of coaxial cable or printed micro-strip. The delays T6 of units 35a, 35b, 35e and 35f are each equal to a half bit time. The remaining delay units, 35c and 35d, each provide a delay of one half that of the other units or one quarter of a bit time. A buffer 36a–36f providing concurrent true and complement outputs is connected to each respective delay line tap. The true outputs of buffers 36a and 36b are connected to line 32 while those of buffers 36d–36f are connected to line 34. Conversely, the complement outputs of buffers 36a and 36b are connected to line 34 and the complement output of buffers 36d–36f are connected to line 32. Lines 32 and 34 may each be considered a "Dot Or" circuit to reflect the input levels thereto. Line 32 is connected to the D input of flip-flop 37 and line 34 is connected to the D input of flip-flop 38. The C inputs of these two flip-flops are connected to the complement and true outputs, respectively, of buffer 36c at the center tap of the delay line.

In operation, it will be seen that the relatively long duration of signal levels during a synchronizing pulse when centered along the six units of the delay line will provide a high level on one of the lines 32 or 34 and a low level on the other. For example, if the high level of the synchronizing pulse is leading, the true output levels of buffers 36d–36f will be high and the complement outputs of buffers 30, 36a and 36b will be high. Thus, flip-flop 38 will be conditioned and upon the occurrence of a positive-going level change, true output of buffer 36c flip-flop 38 will change state providing as an output through OR 39 a SYNC detection signal indicating that a data word follows. Whichever flip-flop is on will be reset by the delayed SYNC signal from delay 16 in FIG. 1.

Although the foregoing description has assumed a data transmission rate of 50 megabits, the circuit can be easily adapted to other frequencies, principally by altering the particular delay times. It will be noted that all necessary timings were obtained from the transmitted data. The unwanted clock pulses were rejected with a single shot timing approach with relatively loose timing accuracy requirements. The resulting self clock is accurate since its rising edges are directly determined by the input wave form. The need for an oscillator has been eliminated, hence, no race conditions are encountered.

The invention is particularly adaptable to multiplexing because it can operate immediately upon receipt of a signal on input bus 10 without requiring the extensive synchronization time required by phase-locked loop decoders, which occurs because any one of several transmitters may be active on the bus, each transmitting with slightly different phase due to different oscillators and different physical locations on the bus.

While the invention has been particularly shown and described with reference to preferred embodiment thereof, it will be understood by those skilled in the art that various changes in form and details may be made therein without departing from the spirit and scope of the invention.

What is claimed is:

1. Apparatus connected to a data bus for producing clocking pulses from an asynchronously transmitted binary code word having a synchronizing wave form followed by a data word having at least one voltage level transition for said wave form and each said data bit comprising:
    detection means responsive to said synchronizing wave form for producing a synchronizing detection signal;
    delay means responsive to each said detection signal for producing a delayed detection signal; and
    coincidence means connected to said code word bus, said detection means and said delay means for providing a clock signal upon the coincidence of a said voltage level transition, a said detection signal and a said delayed detection signal.

2. Apparatus as described in claim 1 further including means for terminating said delayed detection signal and clock signal delay means for thereafter supplying delayed clock signals to said coincidence means as a substitution for said delayed detection signal at said coincidence means.

3. Apparatus as described in claim 2 further including counter means for counting said clock signals.

4. Apparatus as described in claim 3 including data storage means responsive to said clock signals in conjunction with each said data bit transition for storing data represented by said data bit transitions.

5. Apparatus as described in claim 2 wherein said detection signal delay means and said clock signal delay means are each greater than one half the duration of a data bit time.

6. Apparatus as described in claim 3 wherein said counter means provides an output signal to reset said detection means.

7. Apparatus as described in claim 1 wherein said coincidence means is connected to said code word bus through an exclusive OR circuit.

8. Apparatus connected to a data bus for producing clocking pulses from an asynchronously transmitted binary code word having a synchronizing wave form followed by a data word having at least one voltage level transition for said wave form and each said data bit comprising:
    wave form detection means responsive to said synchronizing wave form for producing a synchronizing detection signal including first delay means for receiving said signal and having a series of taps there along at preselected delay times with the total time delay of said first delay means approximating the duration of said synchronizing wave form, enabling signal means connected to certain of said taps and operable to provide an enabling signal upon the occurrence of a said wave form, and bi-stable means connected to said enabling signal means and another of said taps for providing a detection signal upon the coincidental occurrence of said transition at said other tap and said enabling signal;
    second delay means responsive to each said detection signal for producing a delayed detection signal;
    coincidence means connected to said code word bus, said detection means and said second delay means for providing a clock signal upon the coincidence of a said voltage level transition, a said detection signal and a said delayed detection signal; and
    clock signal delay means for thereafter supplying delayed clock signals to said coincidence means as the substitution for said delayed detection signal at said coincidence means.

9. Apparatus as described in claim 8 further including means for generating both true and complement signals from said delay line taps.

10. Apparatus as described in claim 8 wherein said bi-stable means and said enabling signal means include means for providing a said detection signal in response to either a negative-going or positive-going transition in said wave form.

11. In a decoding circuit for an asynchronously transmitted code word signal having a synchronizing wave form with at least one voltage level transition, detection apparatus comprising:
    delay means for receiving said signal and having a series of taps there along at preselected delay times with the total time delay of said line approximating the duration of said synchronizing wave form;
    enabling signal means connected to certain of said taps and operable to provide an enabling signal upon the occurrence of a said wave form; and
    bi-stable means connected to said enabling means at another of said taps for providing a detection signal upon the coincidental occurrence of a said transition at said other tap and said enabling signal.

12. Apparatus as described in claim 11 wherein said taps both precede and succeed said another tap along said delay line.

13. Apparatus as described in claim 11 wherein said enabling signal means includes means for providing both true and complement signals concurrently from said taps.

14. Apparatus as described in claim 11 wherein said bi-stable means is responsive to either a positive-going or negative-going direction of said signal transition.

15. Apparatus connected to a data bus for producing clocking pulses from an asynchronously transmitted binary code word having a synchronizing wave form followed by a data word having at least one voltage transition for said wave form and each said data bit comprising:
    detection means responsive to said synchronizing wave form for producing a synchronizing detection signal;

delay means responsive to each said detection signal for producing a said delayed detection signal;

coincidence means connected to said code word bus, said detection means and said delay means for providing a clock signal upon the coincidence of a said voltage level transition, a said detection signal and a said delayed detection signal; and clock signal delay means for thereafter supplying delayed clock signals to said coincidence means as a substitution for said delayed detection signal and said coincidence means.

16. Apparatus as described in claim 15 further including means for terminating said delayed detection signal.

17. Apparatus as described in claim 15 including data storage means responsive to said clock signals in conjunction with each said data bit transition for storing data represented by said data bit transitions.

18. Apparatus as described in claim 15 wherein said coincidence means includes exclusive OR circuit means for connection to said code word bus.

* * * * *